United States Patent
Serizawa et al.

(10) Patent No.: US 7,445,835 B2
(45) Date of Patent: Nov. 4, 2008

(54) KENAF-FIBER-REINFORCED RESIN COMPOSITION

(75) Inventors: Shin Serizawa, Tokyo (JP); Kazuhiko Inoue, Tokyo (JP); Masatoshi Iji, Tokyo (JP)

(73) Assignee: NEC Corporation, Tokyo (JP)

( * ) Notice: Subject to any disclaimer, the term of this patent is extended or adjusted under 35 U.S.C. 154(b) by 453 days.

(21) Appl. No.: 10/541,747

(22) PCT Filed: Jan. 9, 2004

(86) PCT No.: PCT/JP2004/000100

§ 371 (c)(1), (2), (4) Date: Jul. 8, 2005

(87) PCT Pub. No.: WO2004/063282

PCT Pub. Date: Jul. 29, 2004

(65) Prior Publication Data

US 2006/0147695 A1    Jul. 6, 2006

(30) Foreign Application Priority Data

Jan. 10, 2003 (JP) ............................. 2003-003856
Dec. 5, 2003 (JP) ............................. 2003-407799

(51) Int. Cl.
*B32B 9/00* (2006.01)
*C08K 7/02* (2006.01)

(52) U.S. Cl. ................. 428/297.4; 428/332; 524/9; 524/599

(58) Field of Classification Search .............. 524/9, 524/599; 428/297.4, 332
See application file for complete search history.

(56) References Cited

U.S. PATENT DOCUMENTS

| | | | |
|---|---|---|---|
| 6,495,225 B1 | 12/2002 | Nakajima et al. | |
| 2004/0242803 A1 | 12/2004 | Ohme et al. | |
| 2005/0123744 A1 * | 6/2005 | Mohanty et al. | 428/331 |

FOREIGN PATENT DOCUMENTS

| | | | |
|---|---|---|---|
| JP | 6-239516 A | | 8/1994 |
| JP | 10-273582 A | | 10/1998 |
| JP | 2000-141524 A | | 5/2000 |
| JP | 2000141524 A | * | 5/2000 |
| JP | 2000-219812 A | | 8/2000 |
| JP | 2001-335710 A | | 12/2001 |
| JP | 2002-069303 A | | 3/2002 |
| JP | P3316211 B1 | | 6/2002 |
| JP | 2002-356562 A | | 12/2002 |
| JP | 2002356562 A | * | 12/2002 |
| JP | 2003-009994 A | | 1/2003 |
| JP | 2003009994 A | * | 1/2003 |
| JP | 2003-096321 A | | 4/2003 |
| JP | 2003096321 A | * | 4/2003 |
| JP | 2003-128900 A | | 5/2003 |
| JP | 2003128900 A | * | 5/2003 |
| JP | 2003-213150 A | | 7/2003 |
| JP | 2003-226821 A | | 8/2003 |
| JP | 2003-286402 A | | 10/2003 |

OTHER PUBLICATIONS

Nishino et al., "New technology for forming cellulose composite," Convertech, Aug. 2002, pp. 36-39.

* cited by examiner

*Primary Examiner*—Fred M Teskin
(74) *Attorney, Agent, or Firm*—Foley & Lardner LLP

(57) ABSTRACT

An object of the present invention is to provide a fiber-reinforced resin composition suitable for producing molded articles for products such as electrical and electronic equipment. The object has been achieved by a biodegradable resin composition containing a kenaf fiber, which contains a kenaf fiber in an amount of 10 to 50% by mass. In this case, the biodegradable resin is preferably a crystalline thermoplastic resin, particularly polylactic acid. The average fiber length (number average fiber length of the fibers excluding fragments) of the kenaf fiber is preferably 100 μm to 20 mm, and the kenaf fiber preferably contains a kenaf fiber having a fiber length of 300 μm to 20 mm. As the kenaf fiber, a fiber prepared from bast of kenaf is preferred.

18 Claims, 3 Drawing Sheets

KENAF-FIBER-REINFORCED RESIN COMPOSITION

This application is a National Stage application of PCT/JP2004/000100, filed Jan. 9, 2004, which claims priority from Japanese patent application JP 2003-003856, filed Jan. 10, 2003, and Japanese patent application JP 2003-407799, filed Dec. 5, 2003. The entire contents of each of the aforementioned applications are incorporated herein by reference.

1. Technical Field

The present invention relates to a fiber-reinforced resin composition used for products such as electrical and electronic equipment. More specifically, the present invention relates to a resin composition for molding containing kenaf fibers in a biodegradable resin, which is excellent in the balance of properties such as heat resistance and rigidity, cost-friendly, excellent in environmental compatibility and suitable for use for electrical and electronic equipment.

2. Background Art

Recently, along with thin-modeling and downsizing of electrical and electronic equipment products, there is an increasing demand for fiber-reinforced resin compositions for molding such products. Common fiber-reinforced resin compositions use glass fiber or carbon fiber as a reinforcing fiber. These fibers are effective for improving heat resistance and strength, but on the other hand, plant materials are now attracting attention as a reinforcing material from an environmental viewpoint.

As such plant materials, a technique involving mixing pulp, plant fiber or crushed materials of plants such as kenaf with a thermoplastic resin or a thermosetting resin is disclosed. For example, regarding a thermoplastic resin, as Patent Documents 1 to 6 and non-Patent Document 1 describe, a composition of a fiber originated from a plant or crushed materials of a plant and a thermoplastic resin is disclosed.

Patent Document 1 describes that a resin composition containing kenaf stem fragments, composed of 80 to 50% by mass (% by weight) of kenaf stem fragments broken or cut with maintaining the original structure and 20 to 50% by mass (% by weight) of a synthetic resin can provide a molded article which is free from mill ends, lightweight and has high rigidity and a high aspect ratio.

Kenaf is an annual plant belonging to the mallow family classified into the same category as hibiscus, and it grows rapidly, reaching as high as 4 to 5 m and as wide a stem diameter as 4 to 5 cm, and in the fastest cases, its growth is about 10 cm per day. In this way, kenaf has a fast photosynthetic rate and thus can absorb a large amount of carbon dioxide, and it is therefore attracting attention as one of the means to simultaneously solve the global problems of global warming caused by carbon dioxide and deforestation. The stem of kenaf consists of bast which is a fiber of stem bark and xylem existing at the center of the stem, each of which has different features. The bast accounts for 30% (mass ratio) of the kenaf stem and has a feature that it is long and excellent in strength similarly to fiber of coniferous trees. This bast fiber is used for ropes, cloths, bags and papers. The xylem comprises 70% (mass ratio) of the kenaf stem and is used as reinforcing materials of houses or materials of canoe, and has a feature that the fiber is shorter than the fiber of broad leaf trees. The whole stem composed of bast and xylem resembles broad leaf tree fiber, which can be formed into paper like high quality Japanese washi.

Non-Patent Document 1 describes that a composite material in which a non-woven fabric prepared from kenaf bast is combined with polylactic acid by a wet process has both high mechanical properties and heat resistance.

Patent Document 2 discloses a thermoplastic resin for a transferring member which has improved mechanical strength and heat resistance by incorporating 30 to 55 parts by weight of pulp into a thermoplastic resin. Thermoplastic resins including polypropylene, polyethylene, polystyrene and ABS resin are studied.

Patent Document 3 describes a container for a photosensitive material using a thermoplastic resin composition containing not less than 50% by mass (% by weight) of pulp composed of natural fiber such as kenaf having an average fiber length of 0.3 to 3.0 mm. It is disclosed that the container for a photosensitive material is excellent in dimensional stability and disposal properties, free of odor and does not affect the photographic performance. Thermoplastic resin including petroleum resin, more specifically polyolefin resin, is studied. It is described that in a composition in which only plant fiber is mixed with polyolefin resin, it is difficult to disperse the plant fiber uniformly, and while uniformity can be improved by reducing the mixing ratio of the plant fiber, physical properties such as rigidity, dimensional stability, heat resistance and coating property are decreased; and to increase the mixing ratio of plant fiber for achieving such physical properties and to improve dispersibility, combination of rosin or an analogue thereof and a plasticizer is extremely important.

Patent Document 4 describes a biodegradable resin composition containing 1 to 30 parts by weight of plant fiber powder crushed to a fiber length of 200 μm or less, 99 to 70 parts by weight of aliphatic polyester resin such as polylactic acid and an alkaline earth metal oxide. It is described that in the case of this resin composition, by blending inexpensive plant fiber, the cost of the composition can be reduced and the biodegradation rate of the plant fiber composition can be increased. The publication describes that when the amount blended of plant fiber is 1% by mass or less, the effect of the invention cannot be obtained and when the amount is 30% by mass or more, the fluidity of the composition is decreased and the molding processability is poor.

Patent Document 5 describes a method of effective use of plant fiber which has been conventionally discarded, by using a resin composition containing 40 to 60% by mass (% by weight) of fiber of plant such as straw, crushed to 60 to 100 mesh (150 μm to 250 μm) and 60 to 40% by mass (% by weight) of polylactic acid.

Patent Document 6 describes a composite material containing 1 to 100 parts by mass of cellulose fiber composed of hard linen fiber having a fiber length of 3 to 10 mm and 100 parts by mass of a biodegradable resin such as polylactic acid, which has an improved mechanical strength without decrease in biodegradability.

[Patent Document 1] Japanese Patent No. 3316211 (paragraph 0004)

[Patent Document 2] Japanese Patent Laid-Open No. 6-239516 (paragraph 0007)

[Patent Document 3] Japanese Patent Laid-Open No. 2000-219812 (paragraph 0013 to 0020)

[Patent Document 4] Japanese Patent Laid-Open No. 10-273582 (paragraph 0005, 0006, 0011)

[Patent Document 5] Japanese Patent Laid-Open No. 2002-69303 (paragraph 0013, 0014)

[Patent Document 6] Japanese Patent Laid-Open No. 2001-335710 (paragraph 0003, 0004)

[Non-Patent Document 1] Takashi Nishino, "New Technology for Forming Cellulose Composite", CONVERTECH p 36-39, August, 2002.

PROBLEMS TO BE SOLVED BY THE INVENTION

Outer housing materials of electrical and electronic equipment are required to fulfill, in addition to physical properties for a mere package such as strength, manufacturing requirements such as moldability and design requirements such as good appearance (color shade and texture). The manufacturing requirements include, for example, applicability of injection molding which is a universal technique for producing outer housing materials of electrical and electronic equipment, which means that raw materials (a mixture of resin and fiber in the case of fiber-reinforced resin) are to be flowable at molding temperatures and the fiber can be uniformly dispersed in the resin, and that the problems such as clogging of composition in a molding machine are not caused.

However, it was difficult to apply conventional resin compositions reinforced by pulp, plant fiber or crushed materials of plant to electrical and electronic equipment. For example, in the composition described in Patent Document 1, the fiber length of the kenaf stem fragments used is as long as 20 to 100 mm and the mixing ratio of kenaf is as high as 50 to 80% by mass, and therefore although the composition is excellent in strength, it has a problem that application to outer housing materials of electrical and electronic equipment, in particular electronic equipment, where molding with fine irregularities and molding in a thickness of 5 mm or less are required is difficult. Currently, mobile electronic devices require a thickness of 2 mm or less, and the length of the fiber that can be used is even more limited. Further, the method of preparing a composite material by impregnating polylactic acid into kenaf non-woven fabric described in non-Patent Document 1 involves a problem that it is difficult to apply the method to outer housing materials of electrical and electronic equipment products as far as moldability is concerned.

In addition, the present inventors have studied application of the composition described in Patent Document 2 to an outer housing material of electrical and electronic equipment, and have found that although there was no problem for injection molding, heat resistance was insufficient under load of 1.80 MPa and the reinforcing effect by pulp was not adequate.

The present invention has been made in order to solve the above-described problems and aims at providing a biodegradable plant fiber-reinforced resin composition that can be used for an outer housing material of electrical and electronic equipment products. More specifically, it aims at providing a resin composition which can be molded by injection molding generally used for producing outer housing materials of electrical and electronic equipment products.

DISCLOSURE OF THE INVENTION

To solve the above-described problems, the present inventors have studied various possible plant fibers and from the strength of fiber, compatibility with biodegradable resin and superiority in approaches to global environmental problems, fiber obtained from kenaf has been selected. Then, the content in resin and the properties of the fiber have been studied in detail, and they have completed the following invention.

The kenaf fiber-reinforced resin composition of the present invention is characterized in that the composition is a biodegradable resin composition containing a kenaf fiber, and contains the kenaf fiber in an amount of 10 to 50% by mass. The content of the kenaf fiber is more preferably 15 to 40% by mass.

According to this invention, as the content of the kenaf fiber is set to the above-mentioned range, precise injection molding needed for manufacturing molded articles such as electrical and electronic equipment products is applicable, and an effect can be obtained that the mechanical strength is improved and the heat resistance is also improved. In this regard, moldability by injection molding means that raw materials (a mixture of resin and fiber in the case of fiber-reinforced resin) are flowable at molding temperatures, the fiber can be uniformly dispersed in the resin, and that problems such as clogging of composition in a molding machine do not occur.

In the kenaf fiber-reinforced resin composition of the present invention, the biodegradable resin is preferably a crystalline thermoplastic resin, particularly preferably polylactic acid.

Further, in the kenaf fiber-reinforced resin composition of the present invention, the average fiber length of the kenaf fiber (number average fiber length of the fibers excluding fragments) is preferably 100 μm to 20 mm, and the kenaf fiber preferably contains a kenaf fiber having a fiber length of 300 μm to 20 mm.

The kenaf fiber is preferably prepared from bast of kenaf.

BEST MODE FOR CARRYING OUT THE INVENTION

Figure 1:
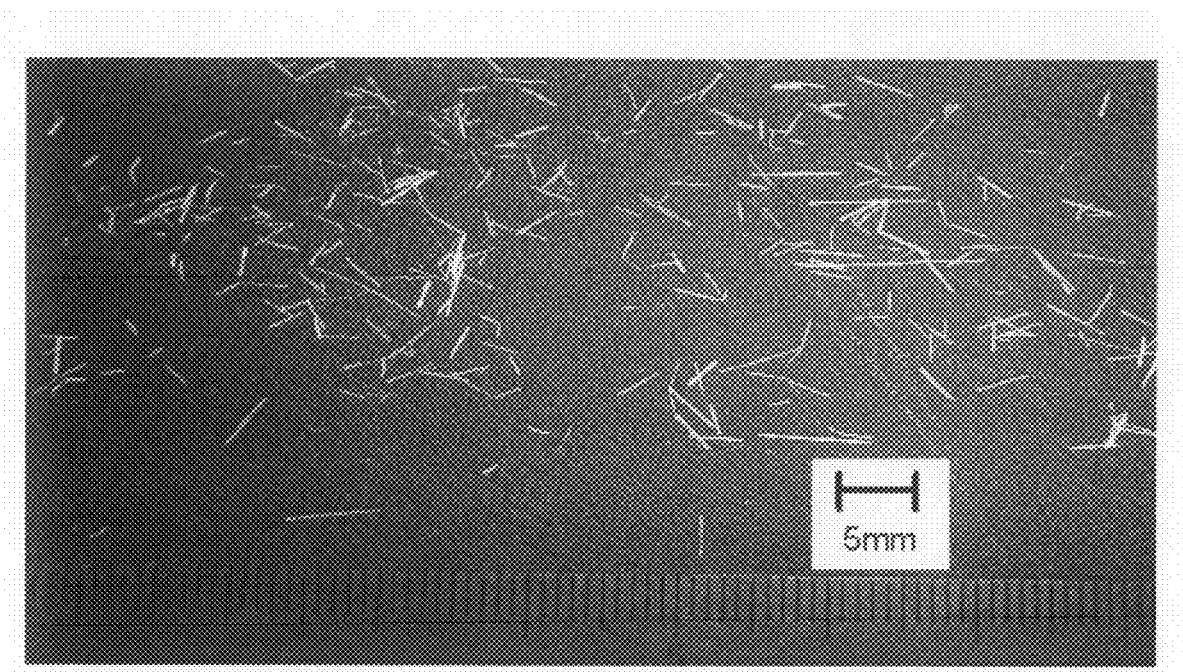
FIG. 1 is a micrograph of bast fiber (kenaf fiber prepared only from bast) used in Example of the present invention.

First, the kenaf fiber constituting the kenaf fiber-reinforced resin composition of the present invention is described in detail.

The kenaf fiber constituting the kenaf fiber-reinforced resin composition of the present invention is obtained by breaking, cutting or crushing kenaf. In the present invention, the kenaf fiber is a generic term referring to fiber prepared from xylem, bast or whole stem combining xylem and bast of kenaf, and blended fiber thereof. In the following description, fiber prepared from xylem is referred to as ligneous fiber, fiber prepared from bast is referred to as bast fiber, and fiber prepared from whole stem is referred to as whole stem fiber. In the present invention, any kenaf fiber can be used, but bast fiber, whole stem fiber, or a blend of ligneous fiber and bast fiber or whole stem fiber is preferably used. Using bast fiber alone is particularly preferred. Bast fiber has high reinforcing effect and by using bast fiber alone, the effect of reinforcing biodegradable resin which forms a molded article can be further improved.

The kenaf fiber employed in the present invention preferably has an average fiber length of 100 μm to 20 mm, and contains at least a kenaf fiber having a fiber length of 300 μm to 20 mm. Since the resin composition of the present invention contains a kenaf fiber of such ranges, the effect of reinforcing biodegradable resin which forms a molded article can be further improved. The average fiber length of the kenaf fiber is more preferably 1 to 10 mm, whereby the effect of reinforcing biodegradable resin can be further increased. Here, the average fiber length means a number average fiber length of the fibers excluding fragments, and fragments are defined as those less than 50 μm in the length in the longitudinal direction.

When the kenaf fiber contained has an average fiber length of more than 20 mm, or kenaf fiber having a fiber length of more than 20 mm is included, the fiber tends not to be uniformly dispersed in the resin in a manufacturing machine such as a kneader when producing kenaf fiber-reinforced resin composition. When a fiber having a length much greater than the thickness of a molded article is included, appearance and touch of the molded article are deteriorated, and the maximum fiber length is therefore desirably not more than 10 times, more desirably not more than 5 times the thickness of the molded article. In addition, in the case of injection molding, clogging of resin composition in a molding machine may be caused. In particular, it is desired that kenaf fiber having a fiber length of more than 50 mm is removed before being introduced into the kneader. On the other hand, when using a kenaf fiber-reinforced resin composition containing only a kenaf fiber having a fiber length of less than 300 μm as a kenaf fiber, the reinforcing effect according to the kenaf fiber is not sufficient.

Studies by the inventors revealed that when kenaf fibers having an average fiber length of 100 μm to 20 mm and including at least kenaf fibers having a fiber length of 300 μm to 20 mm are incorporated into a crystalline thermoplastic resin such as aliphatic polyester resin like polylactic acid, not only the strength is improved, but also the heat resistance indicated by heat distortion temperatures is improved. Although the mechanism is not clear, it is assumed as follows: in the material resin, crystalline portions and amorphous portions are mixed, and as the amorphous portions are fluidized at lower temperatures, the kenaf fiber incorporated into the amorphous portions prevent the amorphous portions from being fluidized, and as a result, the heat resistance is improved. This heat resistance improving effect is further increased when kenaf fibers having an average fiber length of 1 to 10 mm are used as in the above reinforcing effect.

The impact strength of the kenaf fiber-reinforced resin composition will now be described in detail.

To improve the impact strength of the kenaf fiber-reinforced resin composition, kenaf from which fragments are removed is preferably used. Because of inadequacy in adhesion between the kenaf fiber and the resin, the energy at impact is assumed to be absorbed into the friction energy needed for detaching fiber. Therefore, by removing such fragments, the friction energy needed for detaching fiber at impact is increased and the impact strength can be thus improved. Fragments in kenaf fiber can be removed by a known method. Examples thereof include a method using a centrifugal force such as a cyclone separator (Japanese Patent Application No. 7-090180), a method using mechanical classification (Japanese Patent Application No. 2001-348794) and a method using a dust collector. The average fiber length of the kenaf fiber from which fragments are removed is preferably 100 μm to 20 mm, more preferably 1 to 10 mm.

As a method of preparing a resin composition composed of kenaf fiber from which fragments are removed, kneading according to a method involving a low shearing force such as using a single-screw extruder is preferred. By lowering the shearing force, the fiber length of kenaf is more easily maintained. Even in a twin-screw extruder, the shearing force can be lowered by changing the configuration of the screw.

As another method of improving the impact strength, a flexibilizer may be used. For such flexibilizer, known substances can be used and examples thereof include the following.

Plasticizers such as polymer blocks (copolymers) selected from polyester segments, polyether segments and polyhydroxy carboxylic acid segments, block copolymers in which a polylactic acid segment, an aromatic polyester segment and a polyalkylene ether segment are mutually combined, block copolymers composed of a polylactic acid segment and a polycaprolactone segment, polymers containing unsaturated carboxylic acid alkyl ester unit as a main component, aliphatic polyesters such as polybutylene succinate, polyethylene succinate, polycaprolactone, polyethylene adipate, polypropylene adipate, polybutylene adipate, polyhexene adipate and polybutylene succinate adipate, polyethylene glycol and esters thereof, polyglycerol acetic acid ester, epoxidized soybean oil, epoxidized linseed oil, epoxidized linseed oil fatty acid butyl, adipic acid aliphatic polyester, acetyl tributyl citrate, acetyl ricinolic esters, sucrose fatty acid ester, sorbitan fatty acid ester, adipic acid dialkyl ester and alkyl phthalyl alkylglycolate.

The flexibilizers described above can absorb the energy at impact. Generally, addition of a flexibilizer leads to decrease in heat resistance, but by using kenaf together, both the heat resistance and the impact strength of the biodegradable resin can be improved.

As a method of improving impact strength, high strength fiber can be used. Examples of high strength impact resistant fiber include polyamide such as aramid and nylon, polyesters such as polyallylate and polyethylene terephthalate, ultra-high strength polyethylene, polypropylene, teflon® fiber such as PTFE, carbon fiber and metal fiber.

Aramid fiber and polyarylate fiber, which are aromatic compounds, are particularly desirable from the viewpoint that they have higher heat resistance and higher strength, and are paler than other fiber and thus do not damage design properties when added to the resin and have low specific gravity.

As for the shape of the high strength impact resistant fiber, those having a polygonal, amorphous or irregular fiber cross-section, not circular, and having a high aspect ratio and a short fiber diameter have a greater contact area with resin, and therefore the effect of detaching fiber from matrix is increased and the effect of reducing impact by detachment of fiber is also increased, whereby the impact strength is improved. In addition, by using fiber which has irregularities formed on the surface, fiber shaped like a wedge in which both ends of the fiber is broadened compared to the central part, fiber constricted in some part or a non-linear, frizzled fiber, the friction when the fiber is detached is increased to improve impact strength.

Further, the high strength fiber may be subjected to a surface treatment where necessary in order to increase compatibility with the resin which is the base material or to enhance entanglement between fibers. As such surface treatment, treatment by a silane or titanate coupling agent, ozone or plasma treatment, and in addition, treatment by an alkyl phosphoric acid ester surfactant are effective.

However, the method is not limited to these, and methods generally used for surface modification of fillers may be used.

The moisture content of the kenaf fiber is not more than 4% by mass based on the mass of the kenaf fiber. When the moisture content of the kenaf fiber is more than 4% by mass, deterioration of appearance due to "mold cavity" or "blister" may be caused upon molding of the resin composition. The moisture content of the kenaf fiber is particularly preferably not more than 1% by mass based on the mass of the kenaf fiber. When the moisture content of the kenaf fiber is not more than 1% by mass, not only the obtained molded article has excellent appearance, but also a stable reinforcing effect can be exerted on every part of the molded article.

Further, it is also preferable to remove volatile components other than moisture in advance, and this leads to exertion of stable reinforcing effect. As for the volatile components other than moisture in the kenaf fiber, the amount to be generated at 130° C. is particularly preferably not more than 1% by mass based on the mass of the kenaf fiber, and this leads to exertion of stable reinforcing effect. In the case that moisture and volatile components are removed before melt-kneading kenaf fiber and resin or before introducing a kenaf fiber-reinforced resin composition into a molding machine, the kenaf fiber is dried at preferably 30 to 300° C., more preferably 80 to 150° C.

In the kenaf fiber-reinforced resin composition of the present invention, the content of the kenaf fiber is preferably 10 to 50% by mass. When the content of the kenaf fiber is more than 50% by mass, the fluidity of the resin composition is remarkably decreased and problems may arise such that a satisfactory product shape or product pattern cannot be achieved in injection molding often employed as a method of manufacturing electrical and electronic equipment products. In particular, the composition cannot be applied to outer housing materials of electronic equipment which requires molding with fine irregularities or molding in a thickness of 5 mm or less. On the other hand, when the content of the kenaf fiber is less than 10% by mass, the flexural modulus of the obtained molded article is suddenly decreased, and the reinforcing effect is significantly reduced. The content of the kenaf fiber is preferably within the range of 15 to 40% by mass.

When the biodegradable resin in the kenaf fiber-reinforced resin composition of the present invention is a crystalline thermoplastic resin, in addition to the improvement in the mechanical strength, the heat resistance indicated by the heat distortion temperature is improved. Heat resistance is greatly improved where the content of the kenaf fiber is between 10% by mass and 15% by mass, and it hardly changes even if the content is more than 20% by mass. When this phenomenon is considered based on the above-described heat resistance improvement mechanism which the present inventors assumed, it can be explained that the effect of preventing the amorphous portions from fluidizing is exerted at a content of not less than 10% by mass and reaches a ceiling beyond 20% by mass.

Further, a kenaf fiber subjected to a surface treatment can also be used where necessary. The purposes of surface treatment are to improve the compatibility with biodegradable resin and to improve the flame retardancy of the kenaf fiber.

As a method of surface treatment for improving the compatibility (synonymous with improvement in adhesion) between the kenaf fiber and the biodegradable resin, treatment by a silane or titanate coupling agent, ozone or plasma treatment, and in addition, treatment by alkyl phosphoric acid ester surfactant are effective. However, the method is not limited to these, and methods generally used for surface modification of plant fiber may be used. By subjecting kenaf fiber to such surface treatment, the compatibility between the kenaf fiber and biodegradable resin can be improved, and thus the effect of reinforcing the biodegradable resin which forms a molded article can be further improved.

Further, as a surface treatment for improving flame retardancy of the kenaf fiber, general flame retardant treatments for wood or paper may be employed. For example, such method includes immersing kenaf fiber in an aqueous solution of phosphate such as barium phosphate, ammonium phosphate or ammonium polyphosphate to form a flame-retardant phosphate layer on the surface of the fiber. In addition, there is a method comprising immersing kenaf fiber in an aqueous solution of metal alkoxide containing silicon or boron, an aqueous solution in which those elements or a metal compound such as a metal oxide thereof are dissolved using acid or base, silicic acid, boric acid or an aqueous solution of a metal salt thereof to form a flame-retardant metal oxide or other metal compounds on the surface of the fiber. By subjecting the kenaf fiber to such surface treatment, the flame retardancy of the kenaf fiber can be improved, and therefore even when the mold processing temperature for molding is increased, the effect of reinforcing biodegradable resin according to kenaf fiber can be maintained well.

By using kenaf fiber which has undergone such surface treatment, the impact strength of the kenaf fiber-reinforced resin composition can also be improved. The impact strength is improved probably because as the compatibility between the kenaf fiber and the resin is improved, the energy needed for detaching fiber at impact is increased.

The biodegradable resin constituting the kenaf fiber-reinforced resin composition of the present invention will now be described.

As a biodegradable resin material which is the raw material of the biodegradable resin, biodegradable monomers obtained by being mainly artificially synthesized, oligomers and polymers composed of a derivative of a biodegradable monomer obtained by being mainly artificially synthesized, modified oligomers and modified polymers composed of a biodegradable monomer obtained by being mainly naturally synthesized, oligomers and polymers composed of a derivative of a biodegradable monomer obtained by being mainly naturally synthesized, and modified oligomers and modified polymers may be used.

Examples of artificially synthesized biodegradable oligomers and polymers include poly-$\alpha$-hydroxy acid such as polylactic acid (available from Shimadzu Corporation, commercial name: Lacty, etc) and polyglycolic acid, poly-$\omega$-hydroxyalkanoate such as poly-$\epsilon$-caprolactone (available from Daicel Chemical Industries, Ltd., commercial name: Placcel, etc.), polyalkylene alkanoate which is a polymer of butylene succinate and/or ethylene succinate (available from Showa Highpolymer Co., Ltd. commercial name: Bionole, etc.), polyesters such as polybutylene succinate, polyamino acid such as poly-$\gamma$-glutamate (Ajinomoto Co., Inc., commercial name: Polyglutamic acid) and polyols such as polyvinyl alcohol and polyethylene glycol. Further, modified bodies of these artificially synthesized biodegradable oligomers and polymers can be preferably used.

Examples of naturally synthesized biodegradable oligomers and polymers include polysaccharides such as starch, amylose, cellulose, cellulose ester, chitin, chitosan, gellan gum, carboxyl group-containing cellulose, carboxyl group-containing starch, pectinic acid and alginic acid; and poly-$\beta$-hydroxyalkanoate (available from AstraZeneca, commercial name: Biopol, etc.) which is a polymer of hydroxybutyrate and/or hydroxyvalerate synthesized by a microorganism. Of these, starch, amylose, cellulose, cellulose ester, chitin, chitosan, and poly-$\beta$-hydroxyalkanoate which is a polymer of hydroxybutyrate and/or hydroxyvalerate synthesized by a microorganism are preferred. In addition, modified bodies of these naturally synthesized biodegradable oligomers and polymers can be preferably used.

As a derivative of naturally synthesized biodegradable oligomer or polymer, lignin may be used. Lignin is a dehydrogenated polymer of coniferyl alcohol or sinapyl alcohol contained in wood in an amount of 20 to 30% and is biodegradable.

Of biodegradable resin materials described above, artificially synthesized biodegradable oligomers and polymers, derivatives of artificially synthesized biodegradable oligomers and polymers, and derivatives of naturally synthesized biodegradable oligomers and polymers are preferably used because they have moderate intermolecular bonding strength, thus exhibit excellent thermoplasticity, do not cause remarkable increase in the viscosity in the melting process and have excellent molding processability.

Among these, polyesters and modified polyesters which have thermoplasticity and crystallinity are preferred, aliphatic polyesters and modified aliphatic polyesters are even more preferred, and of the aliphatic polyesters, polylactic acid is excellent in the balance of properties and costs. In addition, polyamino acids and modified polyamino acids are preferred, and aliphatic polyamino acids and modified aliphatic polyamino acids are even more preferred. Further, polyols and modified polyols are preferred, and aliphatic polyols and modified aliphatic polyols are even more preferred.

An alloy of another thermoplastic resin, e.g., polypropylene, polystyrene, ABS, nylon, polyethylene terephthalate, polybutylene terephthalate or polycarbonate with the above-mentioned biodegradable resin can be used instead of the biodegradable thermoplastic resin. In particular, an alloy of crystalline thermoplastic resin, for example, polypropylene, nylon, polyethylene terephthalate or polybutylene terephthalate with the above-mentioned biodegradable resin is preferably used.

In addition, thermosetting resins such as phenol resin, urea resin, melamine resin, alkyd resin, acrylic resin, unsaturated polyester resin, diallylphtharate resin, epoxy resin, silicone resin, cyanate resin, isocyanate resin, furan resin, ketone resin, xylene resin, thermosetting polyimide, thermosetting polyamide, styrylpyridine resin, nitrile terminated resin, addition curing quinoxaline and addition curing polyquinoxaline resin, and thermosetting resins using plant materials such as lignin, hemicellulose and cellulose can also be reinforced by kenaf fiber. In the case of using thermosetting resin, a curing agent or a curing accelerator necessary for curing may be used.

The kenaf fiber-reinforced resin composition of the present invention contains 50 to 90% by mass of the above-described biodegradable resin. Within the range that there is no departure from the spirit and the effect of the present invention, in addition to the biodegradable resin and the kenaf fiber which are basic constituents, a crystal nucleating agent and various additives generally added to thermoplastic resin, e.g., an antioxidant, a heat stabilizer, an ultraviolet absorbent, a light stabilizer, an antistatic agent, a neutralizer, a colorant such as pigment, a dispersant, rosin, a plasticizer, a synthetic rubber, an inorganic additive and a flame retardant may be used together. Further, where necessary, an antibacterial agent or an aromatic chemical may be added to the composition for preventing the kenaf fiber and the biodegradable resin from being biologically damaged. The antibacterial agent and/or aromatic chemical may be adhered to kenaf fiber in advance. Because the resin composition of the present invention is composed essentially of a kenaf fiber which is a natural material and a biodegradable resin, the crystal nucleating agent and other additives are also desirably a natural material or a biodegradable material excellent in environmental compatibility.

In the present invention, when a crystalline resin is used, it is preferable to add a crystal nucleating agent to promote crystallization of amorphous portions which has a low flowing onset temperature, whereby improvement in the moldability of the kenaf fiber-reinforced resin composition, shortening of the molding time and improvement in the mechanical strength and the heat resistance of molded articles can be achieved. The crystal nucleating agent itself serves as a crystal nucleus and plays a role to form constituent molecules of the resin into a regular three-dimensional structure. By adding a crystal nucleating agent to the resin composition, crystallization of the amorphous portions are promoted, and therefore even when the mold temperature in the molding process is high, deformation of molded article can be suppressed, and this leads to an effect that the molded article can be easily released from the mold. In particular, even when the mold temperature is higher than the glass transition temperature Tg of the resin, a similar effect can be obtained.

As a crystal nucleating agent, an inorganic crystal nucleating agent or an organic crystal nucleating agent may be used. Examples of inorganic crystal nucleating agent include talc, calcium carbonate, mica, boron nitride, synthetic silicic acid, silicate, silica, kaoline, carbon black, zinc oxide, montmorillonite, clay mineral, basic magnesium carbonate, ground quartz, glass fiber, glass powder, diatomaceous earth, dolomite powder, titanium oxide, zinc oxide, antimony oxide, barium sulfate, calcium sulfate, alumina, calcium silicate and boron nitride.

Examples of organic crystal nucleating agent include (1) organic carboxylic acids, for example, octylic acid, toluic acid, heptanoic acid, pelargonic acid, lauric acid, myristic acid, palmitic acid, stearic acid, behenic acid, cerotic acid, montanoic acid, melissic acid, benzoic acid, p-tert-butylbenzoic acid, terephthalic acid, terephthalic acid monomethyl ester, isophthalic acid, isophthalic acid monomethyl ester, rosin acid, 12-hydroxy stearic acid and cholic acid, (2) organic carboxylic acid alkali (earth) metal salts, for example, alkali (earth) metal salts of the above-described organic carboxylic acids, (3) high molecular weight organic compounds containing a metal salt derived from a carboxyl group, for example, metal salts of carboxyl group-containing polyethylene obtained by oxidation of polyethylene, carboxyl group-containing polypropylene obtained by oxidation of polypropylene, copolymers of an olefin such as ethylene, propylene or butene-1 and acrylic acid or methacrylic acid, copolymers of styrene and acrylic acid or methacrylic acid, copolymers of olefin and maleic anhydride and copolymers of styrene and maleic anhydride, (4) aliphatic carboxylic acid amide, for example, oleic acid amide, stearic acid amide, erucic acid amide, behenic acid amide, N-oleylpalmitoamide, N-stearylerucic amide, N, N'-ethylenebis(stearamide), N,N'-methylenebis(stearamide), methylolstearamide, ethylenebisoleic acid amide, ethylene bisbehenic acid amide, ethylene bisstearic acid amide, ethylene bislauric acid amide, hexamethylene bisoleic acid amide, hexamethylene bisstearic acid amide, butylene bisstearic acid amide, N,N'-dioleylsebacic acid amide, N,N'-dioleyladipic acid amide, N,N'-distearyladipic acid amide, N'-distearyl sebacic acid amide, m-xylylene bisstearic acid amide, N,N'-distearyl isophthalic acid amide, N,N'-distearyl terephthalic acid amide, N-oleyl oleic acid amide, N-stearyl oleic acid amide, N-stearyl erucic acid amide, N-oleyl stearic acid amide, N-stearyl stearic acid amide, N-butyl-N' stearyl urea, N-propyl-N' stearyl urea, N-allyl-N' stearyl urea, N-phenyl-N' stearyl urea, N-stearyl-N' stearyl urea, dimethytol oil amide, dimethyl lauric acid amide, dimethyl stearic acid amide, N,N'-cyclohexanebis (stearoamide) and N-lauroyl-L-glutamic acid-α,γ-n-butyl amide, (5) high molecular weight organic compounds, for example, α-olefins branched at 3-position having 5 or more carbon atoms such as 3,3-dimethylbutene-1,3-methylbutene-1,3-methylpentene-1,3-methylhexene-1,3,5,5-trimethylhexene-1, polymers of vinylcycloalkane such as vinylcyclopentene, vinylcyclohexane and vinylnorbornane, polyalkylene glycols such as polyethylene glycol and polypropylene glycol, polyglycolic acid, cellulose, cellulose ester, cellulose ether, polyester and polycarbonate, (6) organic phosphate or phosphite compounds or a metal salt thereof, for example, diphenyl phosphate, diphenyl phosphite, sodium bis-(4-tert-butylphenyl) phosphate and sodium methylene(2,4-tert-butylphenyl) phosphate, (7) sorbitol derivatives such as bis(p-methylbenzylidene)sorbitol and bis(p-ethylbenzylidene) sorbitol, (8) cholesterol derivatives such as cholesteryl stearate and cholesteryloxystearamide, and (9) thioglycolic anhydride, paratoluene sulfonic acid, paratoluene sulfonic acid amide and a metal salt thereof.

Biodegradable resins such as polylactic acid that can be used in the present invention is what is termed polyester resin, of which the molecular weight is decreased upon hydrolysis. Accordingly, of the above-mentioned crystal nucleating agents, crystal nucleating agents composed of a neutral substance which do not facilitate the hydrolysis of polyester are preferably used. In addition, to prevent decrease in molecular weight of polyester resin due to transesterification, rather than a carboxyl group-containing crystal nucleating agent, an ester or amide compound which is a derivative thereof is preferred as a crystal nucleating agent, and similarly, rather than a hydroxyl group-containing crystal nucleating agent, an ester or ether compound which is a derivative thereof is preferred as a crystal nucleating agent.

An organic crystal nucleating agent which is compatible with or finely dispersed in resin at a high temperature melting condition in injection molding, and precipitated or phase-separated in a mold in the mold cooling step to serve as a crystal nucleating agent is preferably used. As a method of adding a crystal nucleating agent, a common method is to mix the agent with resin directly, but the agent may be previously adhered to granular or fibrous additive, or kenaf fiber. In particular, when an organic crystal nucleating agent is uniformly adhered to the fiber, crystallization of resin on the surface of the fiber is promoted and the intensity of detaching fiber is increased, and as a result, strength properties such as impact strength of a resin containing these fibers may be improved. Further, an inorganic crystal nucleating agent efficiently acts as a crystal nucleus when fine particles of such inorganic substance are highly dispersed in the resin. The surface of such inorganic substance is preferably subjected to a solubilizing treatment (coating treatment using resin or a compound having a solubilizing effect, or ion exchange treatment or surface treatment by a coupling agent). Inorganic crystal nucleating agents which have undergone a solubilizing treatment has increased dispersibility due to the increased interaction with resin and is capable of preventing agglomeration of the inorganic compound.

Of these crystal nucleating agents, layered compounds such as talc are preferred. Further, an inorganic crystal nucleating agent and an organic crystal nucleating agent may be used together. Plural kinds of these crystal nucleating agents may be used together.

The content of the crystal nucleating agent of the kenaf fiber-reinforced resin composition of the present invention is preferably 0.1 to 20% by mass, but not particularly limited.

The method of mixing the components contained in the kenaf fiber-reinforced resin composition of the present invention is not particularly limited, and examples thereof include mixing using a known mixer such as a tumbler or a ribbon blender, and melt-mixing using an extruder or a roll.

The method of molding the kenaf fiber-reinforced resin composition of the present invention is not particularly limited, and usual molding methods for producing electrical and electronic equipment products, such as known injection molding, injection/compression molding and compression molding may be used.

The temperature of melt-mixing and molding can be selected from a temperature at which the resin to be used is softened to 200° C. When the temperature is higher than 200° C., the kenaf fiber suffers from thermal degradation, which may decrease the reinforcing effect.

However, when using kenaf fiber with improved heat resistance by subjecting to surface treatment, thermal degradation of the kenaf fiber can be suppressed and melt-kneading and molding can be thus carried out at 200° C. or higher. Further, in the case that a lubricant which has a melting point lower than the mold processing temperature is used together, melt-kneading and molding can be also carried out at 200° C. or higher. The reason is that since low melting point lubricant is easily dispersed in the resin and easily adhered to the surface of kenaf fiber, it can impart lubricity to the resin and the kenaf fiber, and as a result, shear heating generated between kenaf fibers or between the kenaf fiber and the resin, and friction with the mold surface can be reduced. The reduction of shear heating and frictional heat by combination use of a low melting point lubricant suppresses local temperature rise in the resin, which then prevents fiber from being deteriorated and makes it possible to mold at 200° C. or higher.

EXAMPLES

The operation of the present embodiment will now be described referring to specific Examples.

Example 1

Figure 2:
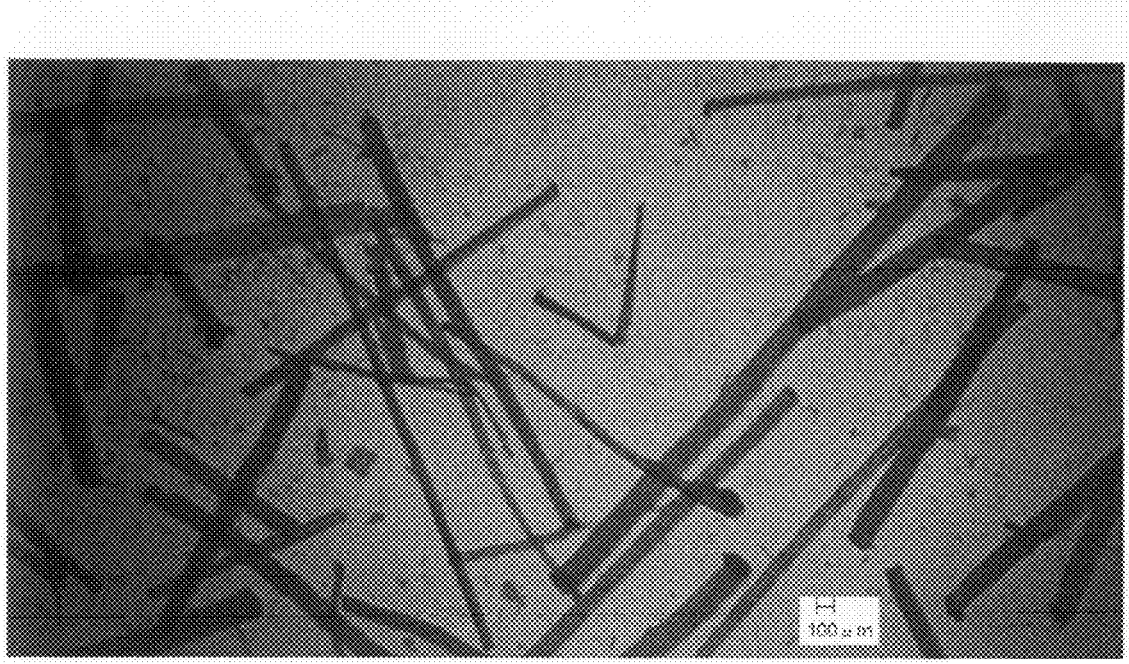
FIG. 2 is a micrograph of bast fiber (kenaf fiber prepared only from bast) used in Example of the present invention.

As a kenaf fiber, a bast fiber (kenaf fiber prepared only from bast) was used. The kenaf fiber had an average fiber length of 3 to 5 mm (number average fiber length of the fibers excluding fragments (those less than 50 μm in the length in the longitudinal direction)). FIG. 1 is a micrograph of the bast fiber (kenaf fiber prepared only from bast) used in this Example, and FIG. 2 is a micrograph of the same bast fiber at different magnification.

10% by mass of this bast fiber and 90% by mass of polylactic acid (available from Shimadzu Corporation, Lacty 9030) were each dried at 100° C. for 5 hours and melt-kneaded in a kneader (S1 Kneader made by KURIMOTO, LTD. kneading temperature: 180° C.) to give pellets. The obtained pellets were dried at 100° C. for 5 hours and molded in an injection molding machine (made by TOSHIBA MACHINE CO., LTD, EC20P-0.4A, molding temperature: 180° C., metal mold temperature: 25° C.), to form test pieces (125×13×3.2 mm).

The test pieces were left in a thermostatic chamber at 100° C. for 4 hours and cooled to room temperature to measure the heat distortion temperature and the flexural modulus. The heat distortion temperature was measured at a high load (1.80 MPa) in accordance with JIS K 7191-2. The flexural modulus was measured in accordance with ASTM D790. The results are shown in Table 1.

Examples 2 to 4

The ratio of the bast fiber to the polylactic acid in Example 1 was changed to bast fiber/polylactic acid=15/85, 20/80, 30/70 (all in mass ratio), and the other conditions were the same as in Example 1. The reinforcing effect of bast fiber on polylactic acid was evaluated in the same manner as in Example 1, and the results are shown in Table 1.

As shown in Table 1, it has been revealed that by incorporating the bast fiber, the flexural modulus of polylactic acid can be improved in the same level of kneadability as that of polylactic acid, and in particular, the heat distortion temperature at high loads can be greatly improved. In addition, as shown in Table 1, in the case of polylactic acid containing bast fiber, the flexural modulus of the polylactic acid could be improved with the same level of kneadability as that of polylactic acid. In particular, it has been found that when the content of the bast fiber was 15% by mass or more, the heat distortion temperature (heat resistance) at high loads can be greatly improved. When the content of the bast fiber is 20% by mass or higher, the improvement in the heat distortion temperature was peaked, but the flexural modulus was further improved. The measured values were associated with no variation and thus exertion of stable reinforcing effect was confirmed.

Comparative Examples 2 to 3

In Comparative Example 2, the ratio of the kenaf fiber to the polylactic acid in Example 1 was changed to kenaf fiber/polylactic acid=5/95 (mass ratio). The conditions were otherwise the same as in Example 1 and the results are shown in Table 1. As shown in Table 1, it has been found that when the content of the bast fiber is 5% by mass or less, the reinforcing effect is hardly obtained and when the content of the bast fiber is in between 5% by mass and 10% by mass, the flexural modulus is significantly improved.

In Comparative Example 3, the ratio of the kenaf fiber to the polylactic acid in Example 1 was changed to kenaf fiber/polylactic acid=60/40 (mass ratio). The conditions were otherwise the same as in Example 1. Although evaluation was attempted in the same manner as in Example 1, pelletizing in the kneading process was difficult and the evaluation following the molding was impossible.

TABLE 1

|  | Ref. Ex. | Ex. 1 | Ex. 2 | Ex. 3 | Ex. 4 | Ex. 5 | Com. Ex. 1 | Com. Ex. 2 | Com. Ex. 3 |
| --- | --- | --- | --- | --- | --- | --- | --- | --- | --- |
| Bast fiber (% by mass) | — | 10 | 15 | 20 | 30 | — | — | 5 | 60 |
| Whole stem fiber (% by mass) | — | — | — | — | — | 15 | — | — | — |
| Flax fiber (% by mass) | — | — | — | — | — | — | — | — | — |
| Polylactic acid (% by mass) | 100 | 90 | 85 | 80 | 70 | 85 | 85 | 95 | 40 |
| Kneadability (*) | ○ | ○ | ○ | ○ | ○ | ○ | ○ | ○ | x |
| Heat distortion temperature (° C.) (load: 1.8 MPa) | 66 | 72 | 108 | 121 | 122 | 98 | 74 | 69 | Cannot be measured |
| Flexural modulus (GPa) | 4.54 | 5.40 | 6.25 | 7.60 | 8.64 | 6.28 | 5.69 | 4.56 | Cannot be measured |

*○: Kneadability is good (pelletizable in the melt-kneading process)
x: Kneadability is poor (not pelletizable in the melt-kneading process)

Example 5

A whole stem fiber prepared from bast and xylem was used instead of the bast fiber in Example 1. The conditions were otherwise the same as in Example 1 and the results are shown in Table 1.

Figure 3:
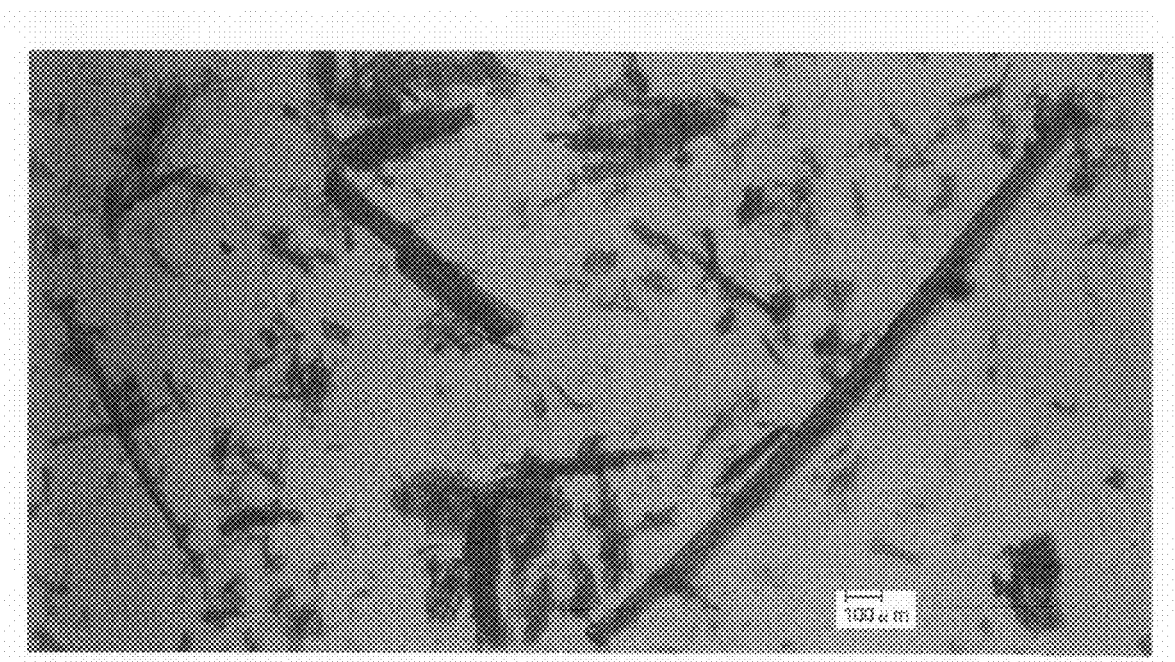
FIG. 3 is a micrograph of whole stem fiber (kenaf fiber prepared from whole stem combining bast and xylem) used in Example of the present invention.

FIG. 3 is a micrograph of the whole stem fiber used. The whole stem fiber had an average fiber length of 100 to 200 μm, but the fiber also contained long fibers of 1 mm or more. The long fibers came from bast. The sample using whole stem fiber also had a reinforcing effect indicated by the flexural modulus equivalent to that of bast fiber as shown in Table 1. On the other hand, the improvement in the heat resistance indicated by the heat distortion temperature was not as excellent as that of the bast fiber. Although studies are not complete, it is assumed that the bast fiber which is a long fiber of mm-level effectively contributed to the improvement in the heat resistance.

Comparative Example 1

A flax fiber which is a soft fiber as kenaf fiber was used instead of the bast fiber in Example 1. The conditions were otherwise the same as in Example 1 and the results are shown in Table 1. As shown in Table 1, it has been revealed that those containing 15% by mass of flax fiber had a reinforcing effect only about the same as that of those containing 10% by mass of bast fiber. The reason is assumed to be that the strength of the flax fiber is lower than that of the kenaf fiber.

Example 6

The ratio of the kenaf fiber to the polylactic acid in Example 1 was changed to kenaf fiber/polylactic acid=15/85 (mass ratio), and pellets using 5% by mass of talc together based on 95% by mass of the kenaf fiber and the polylactic acid were prepared in the same manner as in Example 1. The obtained pellets were dried at 100° C. for 5 hours and molded into a test piece (125×13×3.2 mm) using an injection molding machine (made by TOSHIBA MACHINE CO., LTD, EC20P-0.4A, molding temperature: 180° C., metal mold temperature: 100° C.). As a result, it has been revealed that by using a crystal nucleating agent together, moldability at high mold temperatures can be improved.

Examples 7, 8, 9

A bast fiber (average fiber length 3 to 5 mm, hereinafter bast fiber 2) from which fragments were removed, a bast fiber having an average fiber length of 5 mm (hereinafter bast fiber 3), a flexibilizer (available from Dainippon Ink and Chemicals, Incorporated, PD-150) and polylactic acid (available from Shimadzu Corporation, Lacty 9030) were each dried at 100° C. for 5 hours, and melt-kneaded according to the composition shown in Table 2 using a kneader (S1 Kneader made by KURIMOTO, LTD. kneading temperature: 180° C. ) to give pellets. The obtained pellets were dried at 100° C. for 5 hours and molded into test pieces (125×13×3.2 mm) using an injection molding machine (made by TOSHIBA MACHINE CO., LTD, EC20P-0.4A, molding temperature: 180° C., metal mold temperature: 25°C. ). The obtained test pieces were left in a thermostat chamber at 100° C. for 4 hours and cooled to room temperature and the notched Izod impact strength was measured.

As shown in Example 7 of Table 2, the impact strength was improved by the use of the flexibilizer. As shown in Examples 8 and 9, removal of fragments also led to improvement in the impact strength.

TABLE 2

|  | Ref. Ex. 1 | Ref. Ex. 2 | Ref. Ex. 3 | Ex. 7 | Ex. 8 | Ex. 9 |
|---|---|---|---|---|---|---|
| Bast fiber 1 (containing fragments, % by mass) | — | 20 | — | 20 | — | — |
| Whole stem fiber (% by mass) | — | — | 20 | — | — | — |
| Bast fiber 2 (containing no fragments, % by mass) | — | — | — | — | 20 | — |
| Bast fiber 3 (cut into 5 mm, % by mass) | — | — | — | — | — | 20 |
| Flexibilizer (% by mass) | — | — | — | 20 | — | — |
| Polylactic acid (% by mass) | 100 | 80 | 80 | 60 | 80 | 80 |
| Impact strength (kJ/m$^2$) | 4.4 | 3.1 | 1.6 | 3.9 | 3.8 | 4.2 |

Example 10

Using a bast fiber dried at 100° C. for 5 hours (product similar to the bast fiber of Example 1), toluene diisocyanate (1/10 the amount of kenaf in weight ratio) was added thereto and mixed in chloroform (about 10 times the amount of kenaf in weight ratio) for a pre-determined time (8 hours). Chloroform was then removed to give surface-treated kenaf fiber.

20% by mass of the surface-treated kenaf fiber and 80% by mass of polylactic acid (available from Shimadzu Corporation, Lacty 9030) were each dried at 100° C. for 5 hours, and melt-kneaded using a kneader (S1 Kneader made by KURIMOTO, LTD. kneading temperature: 180° C.) to give pellets. The obtained pellets were dried at 100° C. for 5 hours and molded into a test piece (125×13×3.2 mm) using an injection molding machine (made by TOSHIBA MACHINE CO., LTD, EC20P-0.4A, molding temperature: 180° C., metal mold temperature: 25° C.).

The obtained test piece was left in a thermostat chamber at 100° C. for 4 hours and cooled to room temperature and the notched Izod impact strength was measured. The measurement of the notched Izod impact strength was carried out in accordance with JISK7110. As a result, the impact strength was 3.6 kJ/m$^2$ (impact strength of non-treated fiber: 3.1 kJ/m$^2$).

The present invention is not limited to the above-described Examples and it is obvious that these Examples can be accordingly modified within the technical scope of the present invention.

INDUSTRIAL APPLICABILITY

As described above, according to the kenaf fiber-reinforced resin composition of the present invention, by incorporating a specific amount of a kenaf fiber having a fiber length of not more than 20 mm into a biodegradable resin, preferably a biodegradable thermoplastic resin, a molding process necessary for manufacturing electrical and electronic equipment products can be suitably applied. In addition, while the mechanical strength of the molded article molded using the kenaf fiber-reinforced resin composition of the present invention can be improved, the heat resistance can be also significantly improved. Further, since the resin composition of the present invention contains a kenaf fiber, the shrinking percentage of a biodegradable resin, particularly biodegradable thermoplastic resin can also be reduced.

The invention claimed is:

1. A kenaf fiber-reinforced resin composition, characterized in that the composition is a biodegradable resin composition containing a kenaf fiber and contains the kenaf fiber in an amount of 10 to 50% by mass based on the mass of the fiber-reinforced resin composition, wherein a moisture content of the kenaf fiber is not more than 4% by mass based on the mass of the kenaf fiber.

2. The kenaf fiber-reinforced resin composition according to claim 1, characterized in that the content of the kenaf fiber is 15 to 40% by mass based on the mass of the fiber-reinforced resin composition.

3. The kenaf fiber-reinforced resin composition according to claim 1, characterized in that the biodegradable resin is a crystalline thermoplastic resin.

4. The kenaf fiber-reinforced resin composition according to claim 1, characterized in that the biodegradable resin is polylactic acid.

5. The kenaf fiber-reinforced resin composition according to claim 1, characterized in that the kenaf fiber has an average fiber length (number average fiber length of the fibers excluding fragments) of 100 μm to 20 mm.

6. The kenaf fiber-reinforced resin composition according to claim 5, characterized in that the kenaf fiber contains a kenaf fiber having a fiber length of 300 μm to 20 mm.

7. The kenaf fiber-reinforced resin composition according to claim 1, characterized in that the kenaf fiber is prepared from bast of kenaf.

8. The kenaf fiber-reinforced resin composition according to claim 2, characterized in that the biodegradable resin is a crystalline thermoplastic resin.

9. The kenaf fiber-reinforced resin composition according to claim 2, characterized in that the biodegradable resin is polylactic acid.

10. The kenaf fiber-reinforced resin composition according to claim 3, characterized in that the biodegradable resin is polylactic acid.

11. The kenaf fiber-reinforced resin composition according to claim 2, characterized in that the kenaf fiber has an average fiber length (number average fiber length of the fibers excluding fragments) of 100 μm to 20 mm.

12. The kenaf fiber-reinforced resin composition according to claim 3, characterized in that the kenaf fiber has an average fiber length (number average fiber length of the fibers excluding fragments) of 100 μm to 20 mm.

13. The kenaf fiber-reinforced resin composition according to claim 4, characterized in that the kenaf fiber has an average fiber length (number average fiber length of the fibers excluding fragments) of 100 μm to 20 mm.

14. The kenaf fiber-reinforced resin composition according to claim 2, characterized in that the kenaf fiber is prepared from bast of kenaf.

15. The kenaf fiber-reinforced resin composition according to claim 3, characterized in that the kenaf fiber is prepared from bast of kenaf.

16. The kenaf fiber-reinforced resin composition according to claim 4, characterized in that the kenaf fiber is prepared from bast of kenaf.

17. The kenaf fiber-reinforced resin composition according to claim 5, characterized in that the kenaf fiber is prepared from bast of kenaf.

18. The kenaf fiber-reinforced resin composition according to claim 6, characterized in that the kenaf fiber is prepared from bast of kenaf.

* * * * *